US009948792B2

(12) United States Patent
Turner

(10) Patent No.: US 9,948,792 B2
(45) Date of Patent: *Apr. 17, 2018

(54) METHODS AND APPARATUS FOR ENHANCING RINGBACK TONE QUALITY DURING TELEPHONE COMMUNICATIONS

(71) Applicant: R. Brough Turner, Newton Corner, MA (US)

(72) Inventor: R. Brough Turner, Newton Corner, MA (US)

(73) Assignee: OnMobile Live, Inc., Coral Gables, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/257,444

(22) Filed: Apr. 21, 2014

(65) Prior Publication Data

US 2014/0226806 A1  Aug. 14, 2014

Related U.S. Application Data

(63) Continuation of application No. 11/493,470, filed on Jul. 26, 2006, now Pat. No. 8,705,727.

(Continued)

(51) Int. Cl.
*H04M 5/00* (2006.01)
*H04M 19/04* (2006.01)
(Continued)

(52) U.S. Cl.
CPC ............ *H04M 19/042* (2013.01); *H04B 3/20* (2013.01); *H04B 3/238* (2013.01); *H04M 3/18* (2013.01);
(Continued)

(58) Field of Classification Search
CPC ......... H04M 3/42017; H04M 3/42068; H04M 3/02; H04M 1/72558; H04M 3/42059;
(Continued)

(56) References Cited

U.S. PATENT DOCUMENTS 6,587,323 B1 * 7/2003 Falconer ................ H03K 5/088
361/18
6,711,258 B1 * 3/2004 Sung ................... H04M 1/6016
370/289

(Continued)

*Primary Examiner* — Akelaw Teshale
(74) *Attorney, Agent, or Firm* — Chapin IP Law, LLC

(57) ABSTRACT

A system for enhancing tonal quality for ringback signals in a telecommunications network by adjusting audio processing during an alerting interval of a telecommunications session (e.g. during a telephone call). The system may be embodied in a telecommunications switching device and include a ringback manager process that provides the ability to adjust audio processing (e.g., by signaling to in-path equipment) which enhances the tonal quality of the ringback signal. As an example, a telephone system (e.g. equipment associated with establishment and operation of telephone communications sessions) can disable or attenuate operation of voice quality enhancement processing such as echo cancellation, noise reduction, adaptive level control, and the like, during the ringback or alerting interval or period of a telephone call so that the ringback tone provided to the calling party is not distorted by such processing.

21 Claims, 6 Drawing Sheets

Related U.S. Application Data

(60) Provisional application No. 60/702,439, filed on Jul. 26, 2005.

(51) Int. Cl.

| | | |
|---|---|---|
| *H04B 3/20* | (2006.01) | |
| *H04B 3/23* | (2006.01) | |
| *H04M 3/18* | (2006.01) | |
| *H04M 3/42* | (2006.01) | |
| *H04M 3/00* | (2006.01) | |
| *H04M 3/40* | (2006.01) | |

(52) U.S. Cl.
CPC ........ H04M 3/42017 (2013.01); *H04M 3/002* (2013.01); *H04M 3/40* (2013.01)

(58) Field of Classification Search
CPC ............. H04M 3/5158; H04M 1/6515; H04M 1/6505; H04M 3/533; H04M 11/002; H04M 7/006; H04M 1/57; H04M 3/465; H04M 5/08; H04M 1/31; H04M 19/04; H04M 19/042; H04M 3/002; H04M 3/18; H04M 3/40; H04M 1/035; H04M 2203/1075; H04M 3/493; H04M 15/30; H04M 19/047; H04M 1/82; H04M 3/2272; H04M 9/082; H04W 76/022; H04Q 3/00; H04Q 3/0029
USPC .... 379/207.16, 257, 201.01, 207.02, 207.08, 379/69, 88.19, 82, 88.1, 88.24, 106.09, 379/179, 207.09, 211.03, 211.04, 252, 379/256, 365.01, 373.01–373.03, 376.01, 379/418

See application file for complete search history.

(56) References Cited

U.S. PATENT DOCUMENTS

| | | | |
|---|---|---|---|
| 7,085,370 B1 * | 8/2006 | Arana-Manzano | G10L 25/78 379/377 |
| 7,130,340 B1 * | 10/2006 | Jong | H04B 3/46 375/227 |
| 7,769,155 B2 * | 8/2010 | Radziewicz et al. | 379/207.16 |
| 2005/0239485 A1 * | 10/2005 | Kundu et al. | 455/519 |

* cited by examiner

202
IN RESPONSE TO THE EVENT ASSOCIATED WITH AN ALERTING INTERVAL, MODIFY STATE ASSOCIATED WITH AUDIO PROCESSING APPLIED TO THE TELEPHONE COMMUNICATIONS SESSION

210
APPLY SECONDARY AUDIO PROCESSING TO THE RINGBACK SIGNAL DURING THE ALTERING INTERVAL

211
BOOST THE RINGBACK SIGNAL IN RESPONSE TO DETECTING A NOISY TELEPHONE COMMUNICATIONS SESSION

AND/OR

212
APPLY DISTORTION TO THE RINGBACK SIGNAL IN RESPONSE TO DETECTING A CHARACTERISTIC OF THE FIRST CALLING DEVICE

*FIG. 3*

METHODS AND APPARATUS FOR ENHANCING RINGBACK TONE QUALITY DURING TELEPHONE COMMUNICATIONS

CROSS-REFERENCE TO RELATED APPLICATIONS

This application is a continuation of U.S. patent application Ser. No. 11/493,470, filed Jul. 26, 2006, titled "Methods and Apparatus for Enhancing Ringback Tone Quality During Telephone Communications," which claims priority under 35 U.S.C. § 119(e) to U.S. Provisional Patent Application Ser. No. 60/702,439, filed on Jul. 26, 2005, titled "Enhancing Ringback Tone Quality by Turning Off In-Path Equipment", the entire teachings and contents of which is hereby incorporated herein by reference.

BACKGROUND

Conventional telecommunications systems, including wireless communications, perform various audio processing operations during a communications session between one or more users. In particular, such conventional telecommunications systems perform audio processing operations during the alerting interval of the communications session. The alerting interval is generally the period after a first user has placed a call (e.g., dialed or entered a phone number in a telephone device) and the telephone system has signaled the second user's telephone, but before the second user(s) acknowledges or engages the communications session (e.g., answers or picks up his/her phone). Alternatively, the alerting interval may end when a separate process intervenes before the second user(s) acknowledges the communications session (e.g., via an answering machine or voice mail server). Generally then, the altering interval, sometimes referred to as the "ringback" interval or ringback tone time period, is the part of a telephone call in which a calling user hears a ring tone or ringback tone prior to the called user answering the phone, or prior to activation of voice mail or other call transfer.

In conventional telecommunications systems, during the alerting interval, a preprogrammed audio signal, or ringback message, is sent to the user whom initiated the communications session. Typically, the ringback message attempts to mimic or emulate the sound of a traditional telephone 'ring . . . ring . . . ring' with varying ring lengths and frequencies to indicate to the calling user that the telephone device of the called user is ringing to alert the called user to answer the phone. Conventional ringback messages may also contain other audio content such as prerecorded speech, music and the like. In some conventional systems, telephone users may customize certain ringback content such that a certain song or voice recording is played for specific incoming callers as designated by the telephone user. For example, caller identification (caller ID) technologies can allow a ringback system to play a specific message to a specific caller while that caller is awaiting the called party to answer the telephone. Ringback messages may be customized according to other various factors such as the time of day or the status of the telephone user (e.g., away on vacation).

During a typical communications session using conventional telephony systems, audio data is propagated, routed and augmented by various in-path equipment located between telephone users. The in-path equipment generally perform voice quality enhancement operations to improve the audio quality of a communications session. Such voice quality enhancement operations typically include, amongst others, noise reduction and echo cancellation processing that is applied to audio signals transmitted over the connection.

SUMMARY

Conventional telecommunications systems that perform ringback signaling operations during the alerting interval of a communications session suffer from a variety of drawbacks. In particular, ringback messages are subject to voice enhancement such as echo cancellation, noise reduction and adaptive level control operations while en route to a telephone-calling user during the alerting interval. This can be problematic because the quality of ringback signals, or messages, may be degraded by digital audio signal processing such as voice quality enhancement operations (e.g. noise reduction and echo cancellation processing) that occurs during the transmission of ringback signals through a telecommunications network back to the calling user. In-path equipment devices that reside in the telephone network perform voice quality enhancement operations on the audio signals, including the ringback signals, as the signals are transmitted through the telephone network. This processing is applied in order to improve voice communications between telephone users. However, such conventional audio processing techniques such as voice quality enhancement operations can adversely affect the audio quality of ringback signals when propagated through in-path equipment. This can happen, for example, because the voice quality enhancement operations are designed specifically to process mostly plain voice audio signals, but the ringback tone audio signals often do not match signal patterns associated with plain voice audio signals. For example, music or other ringback tone signals can be adversely affected by voice quality enhancement operations that are designed to work best on voice signals such that the music is distorted or otherwise reduced in quality. Generally then, conventional telecommunications systems do not provide a means for regulating and/or administering in-path audio processing such that the voice quality enhancement techniques can be selectively applied to various audio signals during the ringback or altering interval of a communications session.

Embodiments disclosed herein provide a system for enhancing tonal quality for ringback signals in a telecommunications network by adjusting audio processing during an alerting interval of a telecommunications session (e.g. during a telephone call). The system may be embodied in a telecommunications switching device and include a ringback manager that provides the ability to adjust audio processing (e.g., by signaling to in-path equipment) which enhances the tonal quality of the ringback signal. As an example, a telephone system (e.g. equipment associated with establishment and operation of telephone communications sessions) equipped with configurations disclosed herein can disable or attenuate operation of voice quality enhancement processing such as echo cancellation, noise reduction, adaptive level control, and the like, during the ringback or alerting interval or period of a telephone call so that the ringback tone provided to the calling party is not distorted by such processing. Embodiments of the ringback manager process described herein therefore substantially overcome the aforementioned drawbacks. The ringback manager process can detect an incoming call from a user and, upon determining the activation of an alerting interval, initiate a ringback sequence to the user who initiated the call. Furthermore, in one configuration the ringback manager disables, or dampens or attenuates, the affect of audio processing applied to the ringback signals during transmission through the in-path equipment. In one example implementation, the ringback manager sends a control protocol message to in-path equipment via the telecommunications network. The control protocol messages effectively deactivate, or attenuate, the audio processing (e.g., noise reduction and echo cancellation processing) applied to the ringback signals. As a result, the ringback signals pass unfettered through the network without voice quality enhancement processing applied thereto. Ultimately, without the superfluous audio processing, the quality of the ringback signals is significantly improved. Embodiments disclosed herein are based, in part, on the observation that that certain signal processing such as voice quality enhancement processing is not required or beneficial during the altering interval of a phone call. For example, the ringback signal is not subject to, for example, noise as would be a voice audio signal that is present after the called party answers the phone (i.e., there may be background noise due to surrounding environmental conditions of the calling and/or called party). However, noise is not present in the ringback tone path prior to the called party answering the phone. Thus, by disabling or attenuating noise reduction processing during the altering interval, the fidelity of the ringback signal can be maintained as best as possible for the calling party to hear.

As an example operation, suppose a first user initiates a telephone call via a landline telephone device to a mobile telephone device of a second user. Further assume that the second user has customized the ringback feature in his phone such that a particular song is played during the alerting interval whenever the first user initiates a phone call. After the first user has initiated the phone call to the second user, and while the first user waits for the second user to answer the phone, the first user will hear the song as the ringback during the alerting interval. Moreover, in accordance with embodiment described herein, the ringback content (e.g., the song) carries a control protocol message which disables all in-path voice quality enhancement processing (e.g., echo cancellation). As a result, the song is not distorted by the in-path audio processing and the quality of the ringback content is substantially audible and clear.

In one embodiment of the system described herein, the ringback manager detects the termination of the alerting interval. The termination of the alerting interval typically occurs when the recipient party answers his/her phone, or when a secondary process intervenes (e.g., answering machine or voice mail server). Upon determining that the alerting interval has terminated, the ringback manager signals the in-path audio processing so that voice quality enhancement techniques may be applied to the actual conversation containing voice data. According to one embodiment, the ringback manager increases the audio processing at the termination of the alerting period subsequent to the ringback manager attenuating the audio processing at the initiation of the alerting interval. In an alternate embodiment, the audio processing remains at a deactivated or attenuated state until activated by an event (e.g., answering an incoming phone call). In another embodiment, the audio processing resumes when the ringback manager stops asserting a signal to disable audio processing or a fixed time thereafter.

In yet another embodiment, the ringback manager utilizes specific control protocol messages to disable in-path equipment. For instance, in one embodiment the ringback manager deactivates audio processing in in-path equipment using the tandem free operation (TFO) protocol. Alternatively, the ringback manager may use the signaling for transcoder free operation (TrFO) to disable specific in-path equipment. In still yet another embodiment, the TFO control messages are dynamically injected into the ringback signals as the signals are retrieved and then transmitted through the network. In an alternate embodiment, the ringback content is preconditioned to include TFO control message before the ringback messages are retrieved and transmitted through the telecommunications network.

Configurations described herein further provide a method for controlling a telephone communications session by detecting an event associated with an alerting interval that occurs during the telephone communications session. In this manner, the alerting interval provides a ringback signal to a first calling device while the telephone communications session attempts to engage a user of a second calling device in the telephone communications session. In response to detecting the event associated with an alerting interval, the method performs modifying state associated with audio processing applied to the telephone communications session. To that effect, the audio processing adjusts an audio characteristic of audio transmitted during the telephone communications session.

Furthermore, the method described herein detects activation of the alerting interval during the telephone communications session. In response to detecting activation of the alerting interval, the method performs adjusting the audio processing applied to the telephone communications session during the alerting interval. The audio processing includes attenuating noise reduction and echo cancellation processing applied to the ringback signal during the alerting interval. Additionally, the audio processing includes deactivating noise reduction processing, echo cancellation processing and adaptive level control processing applied to the ringback signal during the alerting interval. In yet another configuration the method performs applying secondary audio processing to the ringback signal during the alerting interval. In operation, the secondary audio processing includes boosting the ringback signal in response to detecting a noisy telephone communications session, and applying specific device-dependent distortion to the ringback signal in response to detecting a characteristic of the first calling device.

In addition, the method described herein performs transmitting a control protocol message to in-path equipment associated with the telephone communications session to adjust audio processing applied to the ringback signal by the in-path equipment to the telephone communications session during the alerting interval. In one embodiment the method performs dynamically applying the control protocol message to the ringback signal. Alternatively, the method performs transmitting the ringback signal to the first calling device over the telephone communications session. In this embodiment, the ringback signal has already been preconditioned with the control protocol message. To implement this, the method performs transmitting a tandem free operation (TFO) message to in-path equipment. Alternatively, the method performs transmitting a transcoder free operation (TrFO) message to in-path equipment.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein. Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM, PROM or FPGA chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by NMS Communications of Framingham, Mass., U.S.A.

BRIEF DESCRIPTION OF THE DRAWINGS

The foregoing and other objects, features and advantages of the invention will be apparent from the following more particular description of embodiments of the methods and apparatus for enhancing ringback tone quality during telephone communications, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus for enhancing ringback tone quality during telephone communications.

FIG. 3 is a flow chart of processing steps that shows high-level processing operations performed by the ringback manager process when it applies secondary audio processing to the ringback signal in accordance with one example configuration of the invention.

DETAILED DESCRIPTION

Figure 1:
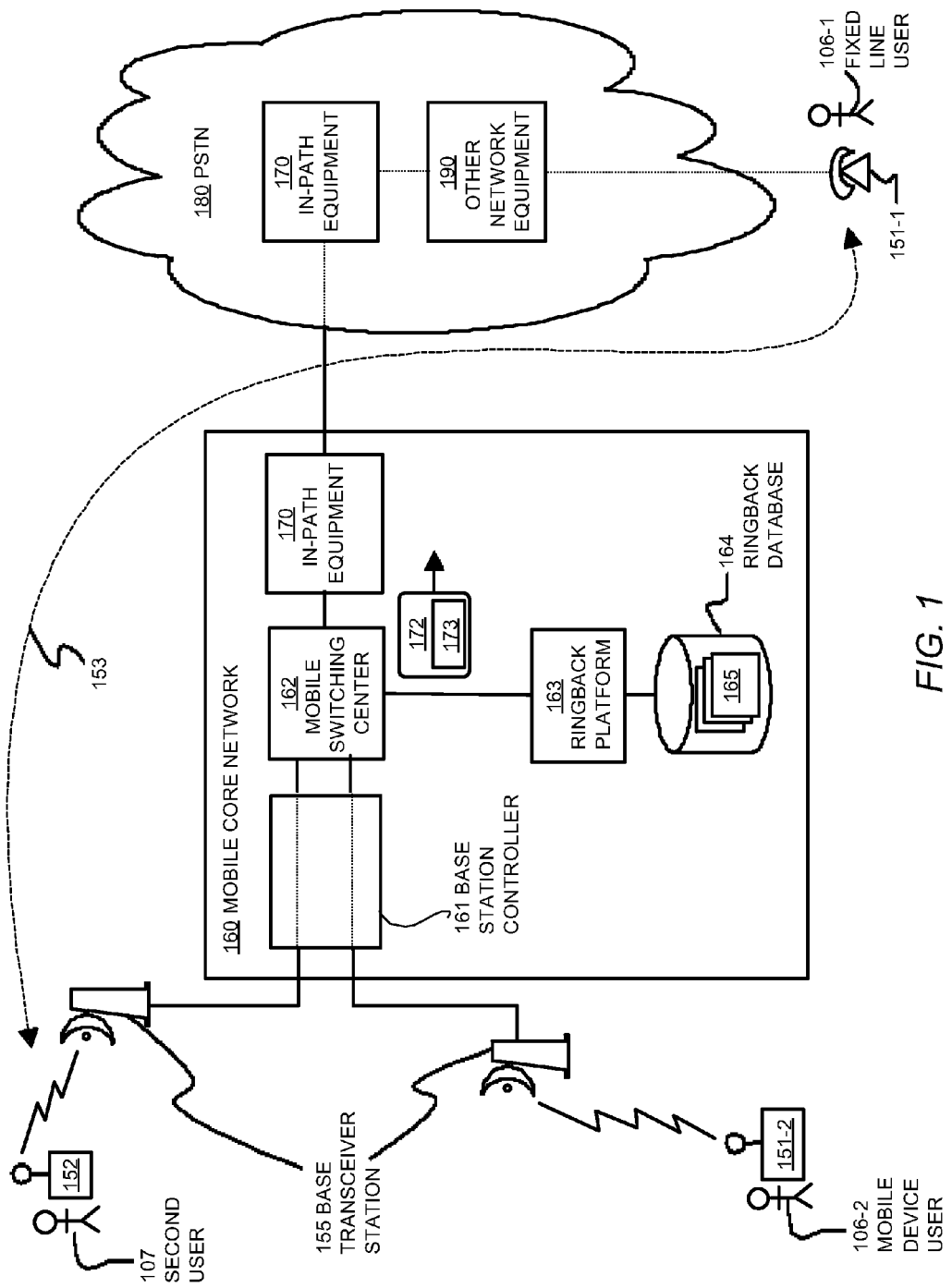
FIG. 1 is a block diagram of a telephone communications system configured with an application including a ringback manager process in accordance with one embodiment of the invention.

FIG. 1 shows an example embodiment of a communications system 150 that supports telephony communications between a first user 106 and second user 107 (e.g., the called or receiving party). The first user may be a mobile device user (e.g., mobile calling party 106-2) or a fixed line device user, such as a "landline" telephone (e.g., fixed line user 106-1). The terminology "first user 106" is used generically herein to describe both the fixed line user 106-1 and mobile calling party 106-2. As such, the terms mobile calling party 106-2 and fixed line user 106-1 may be used interchangeably throughout the embodiments disclosed herein. In the example embodiment depicted in FIG. 1, the communications session 153 involves the fixed line user 106-1 and the second user 107 (e.g., called party). However, it should be noted that the communications session 153 may include mobile calling party 106-2 in lieu of fixed line user 106-1 without departing from the scope or meaning of the embodiments described herein. First user 106 and second user 107 interact with the communications system 150 via a first communications device 151 (e.g., a cellular or mobile telephone 151-2, or fixed line telephone 151-1) and second communications device 152 (e.g., a mobile telephone), respectively. The second communications device sends and receives wireless digital signals with base transceiver station 155 (e.g., cellular tower). In turn, base transceiver station 155 sends and receives audio data to/from the mobile core network 160 via communications channel 156. Typically, the audio data transmitted between base transceiver station 155 and data processing unit 160 is packaged, compressed and transmitted using various coder/decoder (codec) technologies known in the art such as the Global System Mobile (GSM) protocol, the Code Division Multiple Access (CDMA) protocol, and the like. While inside the mobile core network 160, the audio data is processed in base station controller 161 and mobile switching center 162. The base station controller 161 interfaces with base transceiver station 155 and manages radio connections while the mobile switching center 162 coordinates, manages and routes active telecommunications. Furthermore, mobile switching center 162 contains a ringback platform 163 that manages ringback features during the alerting interval of a communications session. In one embodiment, the ringback platform 163 procures ringback content from a ringback database 164 that is logically located within the data processing unit. In yet another embodiment the mobile switching center 162 includes voice quality enhancement processing capabilities such as noise reduction processing, echo cancellation processing, adaptive level control processing and the like.

Still referring to FIG. 1, upon leaving the data processing unit 160, the audio data is transmitted through other parts of the mobile core network and may be transmitted through parts of the public switch telephone network (PSTN) 180. In the mobile switching center 162 and the PSTN 180, audio data is coded and transmitted using typical audio companding methods in accordance with ITU-T (International Telecommunications Union Telecommunication Standardization Sector) standards such as G.711. Ringback tone signals are typically stored and transmitted into the network in G.711 format. If the caller is calling from a fixed line telephone, the ringback tone remains in G.711 format during the entire route from the mobile switching center to the fixed line telephone. If the caller is calling from a mobile handset, then the G.711 coded audio is converted to GSM or CDMA coded audio at the base station controller 161. Audio data is processed at various in-path equipment 170 in the telecommunications link. The in-path equipment may be located in the mobile core network 160 and/or in the PSTN 180. For example, in one embodiment the in-path equipment 170 (e.g., which may include various voice quality enhancement processing capabilities) is logically located between the base station controller 161 and mobile switching center 162. In the PSTN 180, the in-path equipment may also be connected to other network equipment 190 such as, for example, switches, routers, transceivers and the like. The in-path equipment 170 may performs, inter alia, voice quality enhancement operations on audio data (e.g., ringback signal 172) transmitted between first user 106 and second user 107. The voice quality enhancement operations comprise various digital signal processing techniques for improving audio signal quality between end users of communications system 150. For example, in one embodiment the in-path equipment 170 performs noise reductions operations and echo cancellation operations on audio data transmitted between first user 106 and second user 107. The noise reduction and echo cancellation operations are performed in accordance with conventional telecommunication audio processing technologies known in the art. It should be noted that the voice quality enhancement operations may also be performed by equipment within the mobile switching center 162 in addition to, or in lieu of, the in-path equipment 170.

Further details of configurations explained herein will now be provided with respect to flow charts of processing steps that show the high level operations disclosed herein to perform a ringback manager process 145-2.

Figure 2:
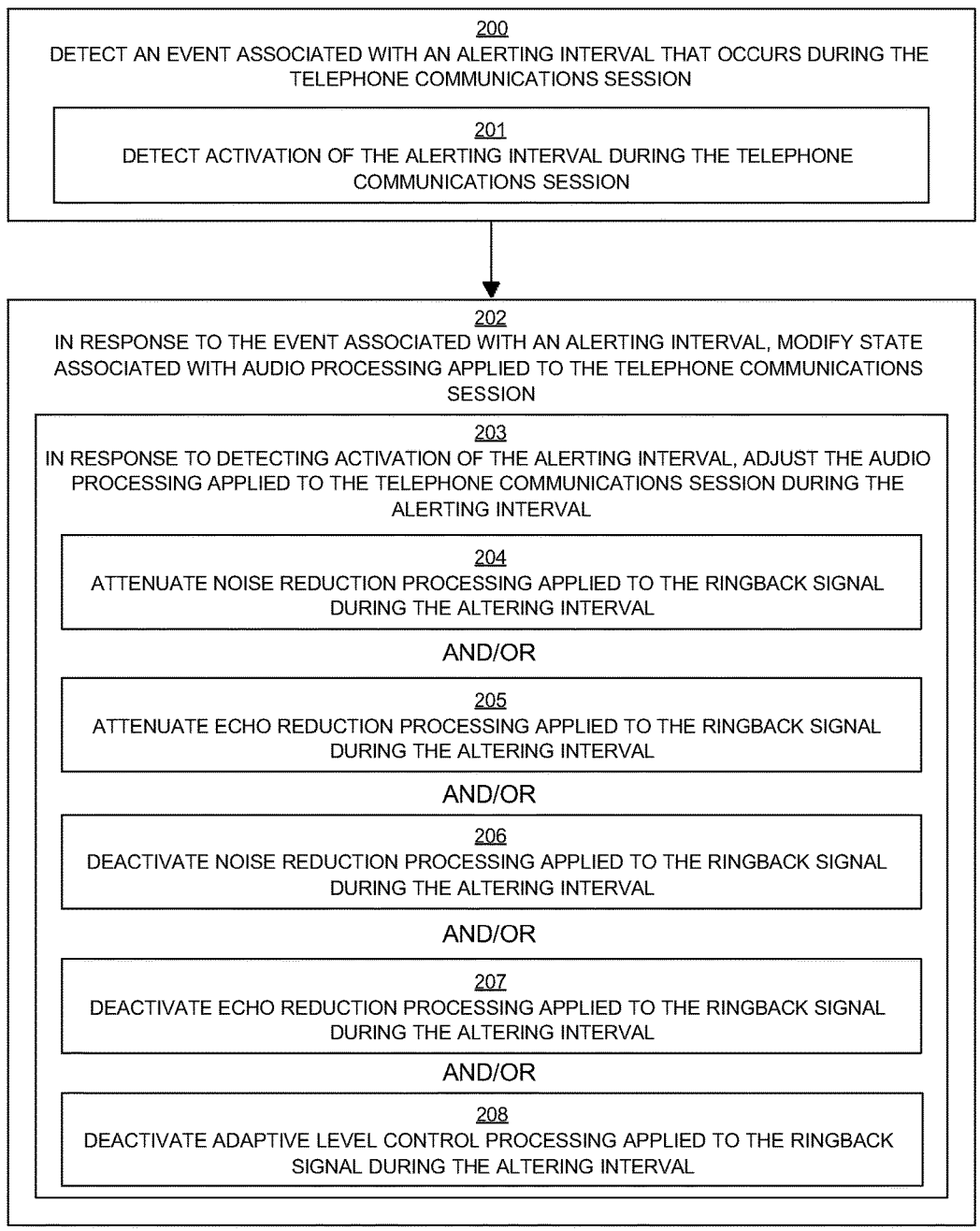
FIG. 2 is a flow chart of processing steps that shows high-level processing operations performed by the ringback manager process when it processes ringback content in accordance with one example configuration of the invention.

FIG. 2 is a flow chart of processing steps that shows high-level processing operations performed by the ringback manager 145 when it performs processing of ringback quality operations in accordance with one example configuration.

In step 200, the ringback manager 145 detects an event associated with an alerting interval that occurs during the telephone communications session 153. The alerting interval provides a ringback signal 172 to a first calling device 106 while the telephone communications session 153 attempts to engage a user 107 of a second calling device 152 in the telephone communications session. In the example embodiment of FIG. 1, the ringback manager 145 is instantiated as a process in the ringback platform 163 and performs telecommunications operations as part of the mobile switching center 162. As discussed in further detail below, the ringback manager 145 may detect an event associated with the activation of the alerting interval (e.g., ringback tone period or time during a telephone call) and/or the termination of the alerting interval. In providing the ringback signal 172, the ringback manager 145 may procure various ringback content from the ringback database 164. The ringback content 165 may include conventional audio ringback signals (e.g., artificial ringtones), prerecording content (e.g., music, comedy routines, etc.) and other audio content suitable for transmission during an alerting interval.

In step 201, the ringback manager 145 detects activation of the alerting interval during the telephone communications session 153. The activation of the alerting interval typically occurs when a telephone user (e.g., first user 106) engages (e.g., places a telephone call to) at least one second user (e.g., second user 107 and/or other multiple users associated with a conference call) with a communications device (e.g., first communications device 106 such as a mobile telephone or landline telephone). In FIG. 1, the ringback manager 145 detects the initiation of a telephone call from the first user 106 via first communications device 151 and, as a result, detects the activation of the alerting interval. The alerting interval continues until the target user (second user 107 in this example embodiment) acknowledges the initiation of the communications session 153 by answering the phone, or until a secondary process intervenes (e.g., an answering machine or voice mail server or call transfer system processes the incoming call).

In step 202, in response to detecting an event associated with an alerting interval, the ringback manager 145 modifies state associated with audio processing applied to the telephone communications session. In its operation, the audio processing adjusts an audio characteristic of audio transmitted during the telephone communications session 153. The audio processing may be performed in the mobile switching center 162, in one or more separate in-path equipment(s) 170, in multiple in-path equipment at different locations, or any combination thereof. In reference to the example in FIG. 1, the audio processing is performed in in-path equipment 170. The in-path equipment 170 is logically located at some position in the PSTN 180 between the first user 106 and the second user 107. Generally, the audio processing involves digital signal processing techniques (e.g., voice quality enhancement) that are well known in the art such as, but not limited to, noise reduction processing and echo cancellation processing.

In step 203, in response to detecting activation of the alerting interval, the ringback manager 145 adjusts the audio processing applied to the telephone communications session 153 during the alerting interval. For example, the ringback manager 145 adjusts certain audio processing in the in-path equipment 170 after detecting the initiation of the communications session 153 (e.g., dialing or entering the telephone number of second user 107) from first user 106 via first communications device 151. Steps 204 through 207 show details of such processing in accordance with example embodiments of configurations disclosed herein.

In step 204, the ringback manager 145 attenuates noise reduction processing applied to the ringback signal 172 during the alerting interval. The noise reduction processing can adversely affect the audio quality of ringback messages. Thus, in attenuating the noise reduction processing applied to the ringback signal 172, the negative affects of the audio processing are mitigated and/or eliminated. In operation, the noise reduction processing may be attenuated to any degree that is less than normal functional levels. Moreover, the ringback manager 145 may attenuate the noise reduction processing such that the affect on the ringback signal 172 is negligible or non-existent. Likewise, in one example embodiment, the ringback manager attenuates the noise reduction processing such that the noise reduction processing is completely disabled.

In step 205, the ringback manager 145 attenuates echo cancellation processing applied to the ringback signal 172 during the alerting interval. Similar to the affect of the noise reduction processing on the ringback signal 172, the echo cancellation processing can also adversely affect the audio quality of ringback messages. Likewise, the echo cancellation processing may be attenuated to any degree that is less than normal functional levels. Additionally, the ringback manager 145 may attenuate the echo cancellation processing such that the affect on the ringback signal 172 is negligible or non-existent. Furthermore, in one example embodiment, the ringback manager attenuates the echo cancellation processing such that the echo cancellation processing is completely disabled.

In step 206, the ringback manager 145 deactivates noise reduction processing applied to the ringback signal 172 during the alerting interval. According to one embodiment as shown in FIG. 1, the ringback manager 145 deactivates the noise reduction processing in the in-path equipment 170. Consequently, the ringback signal(s) 172 passes through the PSTN 180 to the first user 106 without the application of noise reduction processing thereupon. Typically, the noise reduction processing remains in a deactivate state for the duration of the alerting interval.

In step 207, the ringback manager 145 deactivates echo cancellation processing applied to the ringback signal 172 during the alerting interval. In one example embodiment, the ringback manager 145 deactivates the echo cancellation processing in the in-path equipment 170. As a result, the ringback signal(s) 172 passes through the PSTN 180 to the first user 106 without the application of echo cancellation processing thereupon. In general, the echo cancellation processing remains in a deactivate state for the duration of the alerting interval.

In step 208, the ringback manager 145 deactivates adaptive level control processing applied to the ringback signal 172 during the alerting interval. In one example embodiment, the ringback manager 145 deactivates the adaptive level control processing in the in-path equipment 170. As a result, the ringback signal(s) 172 passes through the PSTN 180 to the first user 106 without the application of adaptive level control processing thereupon. In general, the adaptive level control processing remains in a deactivate state for the duration of the alerting interval.

It should be noted that in addition to attenuating and/or deactivating noise reduction, echo cancellation and adaptive level control processing, the scope of the embodiments disclosed herein contemplates the attenuation and/or deactivation of various other voice quality enhancement processing known in the art that are suitable for digitally processing audio or voice data in a telecommunications system.

Note that in alternative embodiments, in addition to (or in substitution of) deactivation of certain audio processing applied during the altering interval, configurations disclosed herein can activate certain alerting interval-specific audio processing that might be, for example, specific to the ringback alerting interval period only. For example, if noise reduction and echo cancellation are turned off or attenuated (e.g. reduced) during the alerting interval, the ringback system can provide a ringback tone such as music to the calling party while awaiting answer of the call by the called party. However, the ringback system can be configured with a system to sense noise associated with the calling party. Perhaps the calling party is in an environmental area with large amounts of background noise (e.g. a sporting event or construction site, for example). In such cases, the ringback manager 145 can activate, for example, alerting-interval ringback signal amplification processing to boost the ringback tone signal to compensate for the inability of the calling party listener to clearly hear the ringback tone.

FIG. 3 is a flow chart of processing steps that shows high-level processing operations performed by the ringback manager 150 when it applies secondary audio processing to the ringback signal in accordance with one example configuration.

In step 210, the ringback manager 145 applies secondary audio processing to the ringback signal 172 during the alerting interval. Generally, the secondary audio processing is applied to the ringback signal to improve the quality of the audio signal and to compensate for the characteristics of specific speech coders used during the mobile transmission leg of a call. If the calling party is on a fixed line telephone, the ringback message 170 is coded in G.711 format during the entire transmission route from the ringback platform 163 to the calling party (e.g., first user 106). However, if the calling party (e.g., mobile device user 106-2) is placing a call from a mobile device (e.g., cellular phone), the communication path between the mobile device and base station controller 161 uses a highly efficient speech coder that is typically optimized for speech and not music. The specific speech coder used depends upon the network (e.g., GSM or CDMA) and the age of the mobile device (e.g., more recent devices are typically synonymous with more efficient standards). At the base station controller 161, the audio communication is converted from GSM (or CDMA) speech coding to G.711 coding, and vice versa, depending on the flow of the data. Generally, G.711 is used in the mobile core network 160 and throughout the PSTN 180. As such, the secondary audio processing may be performed in the mobile switching center 162, in a separate in-path equipment 170, in multiple in-path equipment, or any combination thereof.

In step 211, the ringback manager 145 boosts the ringback signal 172 in response to detecting a noisy telephone communications session 153. According to one example embodiment, the ringback manager 145 boosts the ringback signal 172 as part of the processing in the mobile switching center 162. In an alternate embodiment, the ringback manager 145 instructs a secondary device (e.g., in-path equipment 170) located in the PSTN 180 to boost the ringback signal 172. The ringback signal 172 is boosted in accordance with conventional voice quality enhancement technologies generally known in the art.

In step 212, the ringback manager 145 applies distortion to the ringback signal in response to detecting a characteristic of the first calling device 106. In order to compensate for the behavior of specific speech coders used by mobile handsets and other mobile handset-specific signal processing, the ringback manager 145 may preprocess the ringback signal 172 such that the ringback signal is distorted vis-à-vis its intended original format. As a result, pre-distortion is particularly preferred when the calling party (e.g., mobile device user 106-2) is using a mobile device (e.g., a cellular phone). After voice quality enhancement processing is applied, the distorted ringback signal is manifest substantially the same as the original ringback signal 172.

Figure 4:
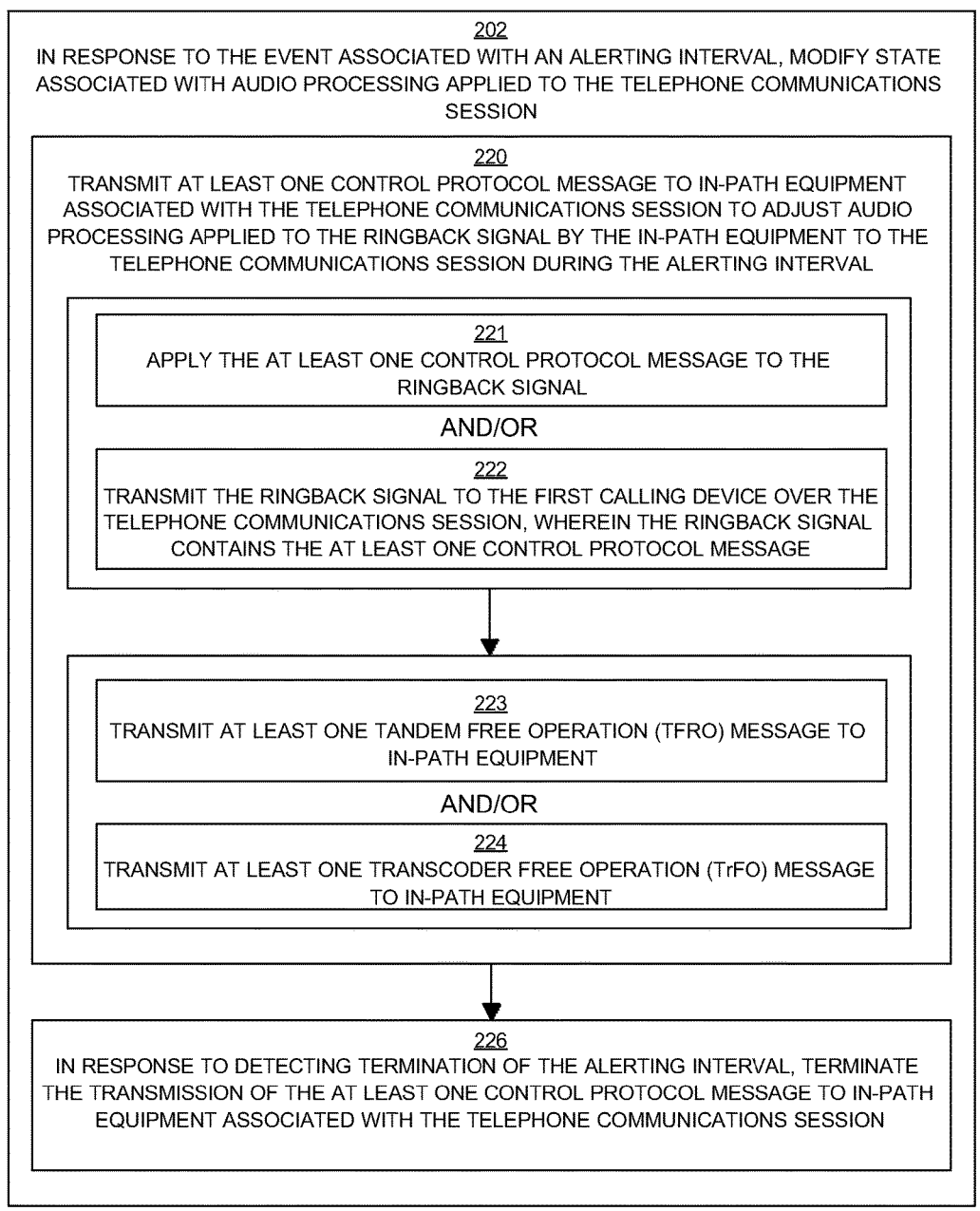
FIG. 4 is a flow chart of processing steps that shows high-level processing operations performed by the ringback manager process when it transmits control protocol messages in accordance with one example configuration of the invention.

FIG. 4 is a flow chart of processing steps that shows high-level processing operations performed by the ringback manager 150 when it transmits control protocol messages in accordance with one example configuration.

In step 220, the ringback manager 145 transmits at least one control protocol message 173 to the in-path equipment 170 associated with the telephone communications session 153 to adjust audio processing applied to the ringback signal 172 by the in-path equipment to the telephone communications session during the alerting interval. In converting audio data from GMS or CDMA standard to G.711 standard, the GMS/CDMA audio data (typically transmitted at a 13 kilobit/second "Kbps" transfer rate) is packaged in the two least significant bits of an 8 bit data packet used in G.711 (typically transmitted at a 64 Kbps transfer rate). In one embodiment disclosed herein, the control protocol messages 173 are transmitted across the PSTN 180 (e.g., G.711 standard) via the least significant bit of every sixteenth data packet of a ringback signal 172.

In step 221, the ringback manager 145 applies the at least one control protocol message 173 to the ringback signal 172. In other words, the ringback manager 145 dynamically injects the control protocol message(s) 173 into the ringback signal 172 as the ringback signal is retrieved from the ringback database 164 and transmitted to the intended user (e.g., first user 106) from the mobile switching center 162. Assume that in one embodiment the ringback signal 172 is transmitted across the PSTN 180 via 8 bit data packets at 64 Kbps. In such an example embodiment, the ringback manager 145 dynamically injects the control protocol message(s) 173 into the least significant bit of every sixteenth data packet of the ringback signal 172. Armed with the control packet message(s), the ringback signal 172 instructs the in-path equipment 170 to adjust audio processing applied to the ringback signal 172 in accordance with the control packet procedure.

In step 222, the ringback manager 145 transmits the ringback signal 172 to the first calling device 151 over the telephone communications session 153. In this example embodiment, the ringback signal contains the at least one control protocol message 173. Stated differently, the at least one control protocol message 173 is embedded in the ringback signal 172 (or the ringback signal 172 is preconditioned with the control protocol message 173) prior to transmission across the PSTN 180. For example, in one embodiment the ringback signals 172 in the ringback database 164 are preconditioned with at least one control protocol message 173 such that the least significant bit of every sixteenth ringback signal data packet contains control protocol information.

In step 223, the ringback manager 145 transmits at least one tandem free operation (TFO) message to in-path equipment 170. TFO is a standardized in-band telephony communications protocol that can manipulate, adjust, enable, disable, etc., the functionality of various in-path equipment (e.g., transcoders). According to one embodiment a TFO message is dynamically injected into the ringback signal 172 (e.g., stored in the least significant bit of every sixteenth 8-bit data packet) as the ringback signal is retrieved from the ringback database 164 and transmitted from the mobile switching center 162. In an alternate embodiment, the ringback signal 172 is preconditioned with the TFO message prior to transmission across the PSTN 180 and, as a consequence, the ringback manager 145 does not need to dynamically apply the TFO control message to the ringback signal 172.

In step 224, the ringback manager 145 transmits at least one transcoder free operation (TrFO) message to in-path equipment. Similar to TFO, TrFO is a standardized out-of-band telephony communications protocol that can manipulate, adjust, enable, disable, etc., the functionality of specific in-path equipment (e.g., transcoders). Thus, in using TrFO messages, the ringback manager 145 may select to disable specific in-path equipment. In one example embodiment at least one TrFO message is transmitted over a separate (e.g., out-of-band) signaling channel in conjunction (synchronously or asynchronously) with the ringback message 172 in order to attenuate and/or deactivate at least one in-path equipment 170. In yet another embodiment, the ringback manager 145 instructs the mobile switching center 162 (or similar logical network device) to transmit out-of-band TrFO messages to various in-path equipment 170 in order to attenuate and/or deactivate audio processing (e.g., voice quality enhancement).

In step 225, the ringback manager 145 detects termination of the alerting interval during the telephone communications session as will be discussed in more detail.

In step 226, in response to detecting the termination of the alerting interval, the ringback manager 145 terminates the transmission of the control protocol message to in-path equipment associated with the telephone communications session. In this manner, the termination of the transmission of the at least one control protocol message 173 enables reactivation of audio signal processing. For example, in one embodiment the ringback manager 145 terminates the transmission of at least of a noise reduction message, an echo cancellation message, and/or a adaptive level control message in order to enable the reactivation of the respective audio processing (e.g., voice quality enhancement processing) in the in-path equipment 170. It should be noted that the ringback manager may terminate the transmission of other various voice quality enhancement processing techniques known in the art that are suitable for digitally processing audio or voice data in a telecommunications system. In yet another embodiment the ringback manager 145 terminates the transmission of either a TFO message or a TrFO message in order to enable the reactivation of the respective audio processing.

More specifically, upon termination of the alerting interval (e.g., a user answers the telephone), the mobile switching center 162 cuts off the connection to the ringback source (e.g., ringback platform 163) and connects the two parties (e.g., the calling party and the called party). At this point, the in-path equipment 170 no longer receives the control protocol messages 173 (e.g., TFO or TrFO signals), and resumes normal functionality soon thereafter. In one example embodiment, the control protocol messages 173 initiate a timeout sequence at the in-path equipment 170 (e.g., a few hundred milliseconds), such that the in-path equipment resumes normal operation when the timeout period lapses and no further control protocol messages have been received. In one embodiment, by the time the alerting interval terminates and the mobile switching center 162 connects the active parties, the timeout sequence of the last control protocol message 173 sent to the in-path equipment (e.g., TFO or TrFO signals) may not have lapsed. In this case, the in-path equipment processing will resume shortly after the live conversation has been initiated. However, since the timeout interval is so small, the effect of the delayed voice enhancement processing during the initial moments (e.g., the first 200 milliseconds) of the live conversation is negligible to an average human ear.

Figure 5:
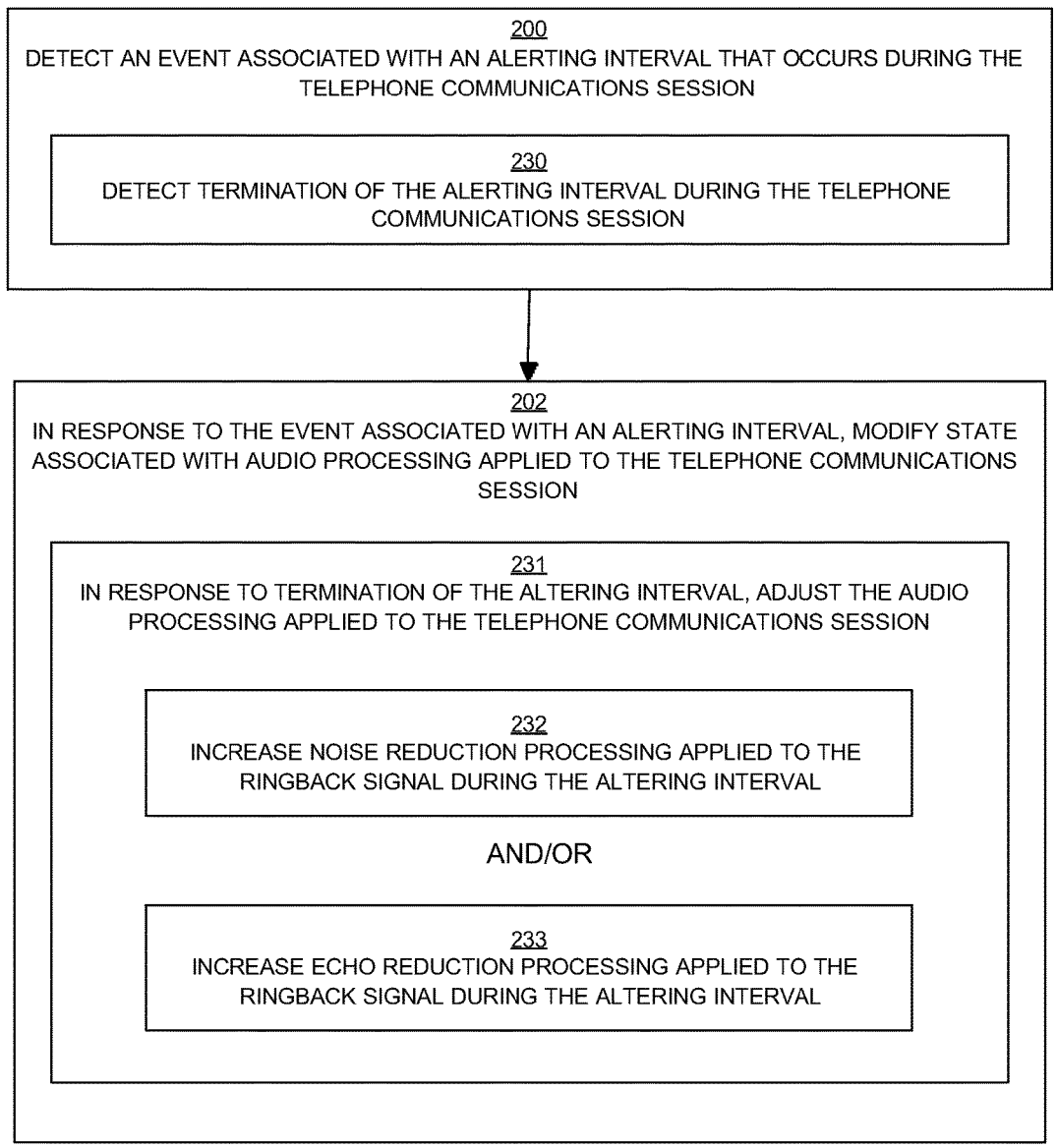
FIG. 5 is a flow chart of processing steps that shows high-level processing operations performed by the ringback manager process when it detects an event associated with the alerting interval in accordance with one example configuration of the invention.

FIG. 5 is a flow chart of processing steps that shows high-level processing operations performed by the ringback manager 150 when it detects an event associated with the alerting interval in accordance with one example configuration.

In step 230, the ringback manager 145 detects termination of the alerting interval during the telephone communications session 153. For example, the ringback manager 145 adjusts certain audio processing in the in-path equipment 170 after detecting the termination of the alerting interval. Termination of the alerting interval typically occurs, for instance, when a user (e.g., second user 107) answers the phone, or when a secondary process intervenes (e.g., via an answering machine or voice mail server). It should be noted that in one example embodiment the ringback manager 145 detects the termination of the alerting interval in addition to detecting the activation of the alerting interval.

In step 231, in response to detecting termination of the alerting interval, the ringback manager 145 adjusts the audio processing applied to the telephone communications session 153. The ringback manager 145 may adjust audio processing using the methods as previously described herein with respect to various in-path equipment procedures and control protocol messages. Additionally, in one embodiment the ringback manager 145 adjusts audio processing in response to termination of the alerting interval after the ringback manager 145 adjusted audio processing in response to activation of the alerting interval.

In step 232, the ringback manager 145 increases noise reduction processing applied to the ringback signal 172 during the alerting interval. By increasing the noise reduction processing, the ringback manager enables voice quality enhancement processing to be applied to post—"alerting interval" communications between users (e.g., first user 106 and second user 107). In one embodiment the ringback manager 145 increases noise reduction processing (e.g., at in-path equipment 170) in order to compensate for the previous attenuation of the noise reduction processing at the activation of the alerting interval, as previously discussed. In another embodiment the ringback manager 145 increases the noise reduction processing because the noise reduction processing is maintained at a default attenuated/deactivated state during normal telecommunications processing.

In step 233, the ringback manager 145 increases echo cancellation processing applied to the ringback signal 172 during the alerting interval. Similarly, by increasing the echo cancellation processing, the ringback manager enables voice quality enhancement processing to be applied to post— "alerting interval" communications between users (e.g., first user 106 and second user 107). According to one embodiment the ringback manager 145 increases echo cancellation processing (e.g., at in-path equipment 170) in order to compensate for the previous attenuation of the echo cancellation processing upon activation of the alerting interval, as previously discussed. In another embodiment the ringback manager 145 increases the echo cancellation processing because the echo cancellation processing is maintained at a default attenuated/deactivated state during normal telecommunications processing.

Figure 6:
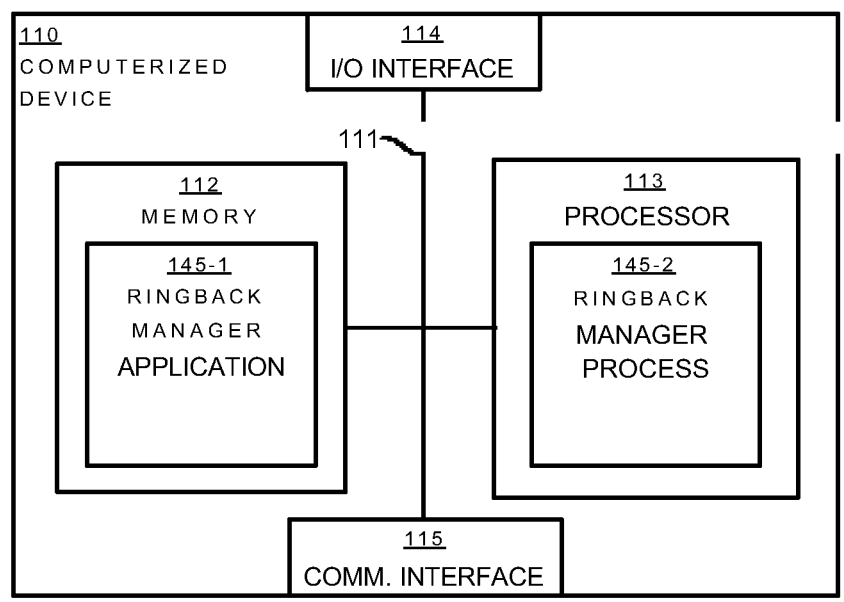
FIG. 6 is a block diagram of a computerized system configured with a ringback manager application in accordance with one embodiment of the invention.

FIG. 6 is a block diagram illustrating example architecture of a computer system 110 that executes, runs, interprets, operates or otherwise performs a ringback manager application 145-1 and process 145-2 configured in accordance with embodiments of the invention. The computer system 110 may be any type of computerized device such as a personal computer, workstation, portable computing device, console, laptop, network terminal, in-path telephony equipment or the like. As shown in this example, the computer system 110 includes an interconnection mechanism 111 such as a data bus, motherboard or other circuitry that couples a memory system 112, a processor 113, an input/output interface 114, and a communications interface 115.

The memory system 112 is any type of computer readable medium and in this example is encoded with a ringback manager application 145-1 that supports generation, display, and implementation of functional operations as explained herein. The ringback manager application 145-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the ringback manager application 145-1. Execution of the ringback manager application 145-1 in this manner produces processing functionality in a ringback manager process 150-2. In other words, the process 145-2 represents one or more portions or runtime instances of the application 145-1 (or the entire application 145) performing or executing within or upon the processor 113 in the computerized device 110 at runtime.

It is noted that example configurations disclosed herein include the ringback manager application 145-1 itself (i.e., in the form of un-executed or non-performing logic instructions and/or data). The ringback manager application 145-1 may be stored on a computer readable medium (such as a floppy disk), hard disk, electronic, magnetic, optical or other computer readable medium. The ringback manager application 145-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the ringback manager application 150-1 in the processor 113 as the ringback manager process 145-2. In another alternative configuration, the ringback manager process 145-2 may be embedded in the operating system or may operate as a separate process from the application and may track all user input or only some user input (such as mouse movement or clicks, but not keyboard input). Those skilled in the art will understand that the computer system 110 may include other processes and/or software and hardware components, such as an operating system not shown in this example.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present disclosure. As such, the foregoing description of embodiments of the present application is not intended to be limiting. Rather, any limitations to the invention are presented in the following claims. Note that the different embodiments disclosed herein can be combined or utilized individually with respect to each other.

What I claim is:

1. A method for controlling a telephone communications session, the method comprising:
   detecting initiation of an alerting interval that occurs during the telephone communications session, the alerting interval providing a ringback signal to a first calling device while the telephone communications session attempts to engage a user of a second calling device in the telephone communications session;
   in response to detecting the initiation of the alerting interval, modifying state associated with audio processing applied to the telephone communications session, the audio processing adjusting an audio characteristic of audio transmitted during the telephone communications session by boosting the ringback signal received by the caller during the alerting interval in response to detecting a noisy telephone communications session.

2. The method of claim 1 wherein detecting initiation of an alerting interval that occurs during the telephone communications session comprises:
   detecting activation of the alerting interval during the telephone communications session;
   and wherein modifying state associated with audio processing applied to the telephone communications session comprises:
   in response to detecting activation of the alerting interval, adjusting the audio processing applied to the telephone communications session during the alerting interval.

3. The method of claim 2 wherein adjusting the audio processing applied to the telephone communications session comprises at least one of:
   attenuating noise reduction processing applied to the ringback signal during the alerting interval; and
   attenuating echo cancellation processing applied to the ringback signal during the alerting interval.

4. The method of claim 2 wherein adjusting the audio processing applied to the telephone communications session comprises at least one of:
  deactivating noise reduction processing applied to the ringback signal during the alerting interval;
  deactivating echo cancellation processing applied to the ringback signal during the alerting interval; and
  deactivating adaptive leval control processing applied to the ringback signal during the alerting interval.

5. The method of claim 2 wherein modifying state associated with audio processing applied to the telephone communications session comprises:
  applying secondary audio processing to the ringback signal during the alerting interval.

6. The method of claim 5 wherein applying secondary audio processing to the ringback signal during the alerting interval comprises
  applying distortion to the ringback signal in response to detecting a characteristic of the first calling device.

7. The method of claim 2 wherein modifying state associated with audio processing applied to the telephone communications session comprises:
  transmitting at least one control protocol message to in-path equipment associated with the telephone communications session to adjust audio processing applied to the ringback signal by the in-path equipment to the telephone communications session during the alerting interval.

8. The method of claim 7 wherein transmitting at least one control protocol message to in-path equipment comprises:
  applying the at least one control protocol message to the ringback signal.

9. The method of claim 7 wherein transmitting at least one control protocol message to in-path equipment comprises:
  transmitting the ringback signal to the first calling device over the telephone communications session, the ringback signal containing the at least one control protocol message.

10. The method of claim 7 wherein transmitting at least one control protocol message to in-path equipment comprises at least one of:
  transmitting at least one tandem free operation (TFO) message to in-path equipment; and
  transmitting at least one transcoder free operation (TrFO) message to in-path equipment.

11. The method of claim 1 wherein detecting initiation of an alerting interval that occurs during the telephone communications session comprises:
  detecting termination of the alerting interval during the telephone communications session;
  and wherein modifying state associated with audio processing applied to the telephone communications session comprises:
  in response to termination of the alerting interval, adjusting the audio processing applied to the telephone communications session.

12. The method of claim 11 wherein adjusting the audio processing applied to the telephone communications session comprises at least one of:
  i) increasing noise reduction processing applied to the ringback signal during the alerting interval; and
  ii) increasing echo cancellation processing applied to the ringback signal during the alerting interval.

13. The method of claim 3 wherein detecting initiation of an alerting interval that occurs during the telephone communications session comprises:
  detecting a secondary event indicating termination of the alerting interval during the telephone communications session;
  and wherein modifying state associated with audio processing applied to the telephone communications session comprises:
  in response to termination of the alerting interval:
    i) increasing noise reduction processing applied to the ringback signal during the alerting interval; and
    ii) increasing echo cancellation processing applied to the ringback signal during the alerting interval.

14. The method of claim 7 wherein detecting initiation of an alerting interval that occurs during the telephone communications session comprises:
  detecting termination of the alerting interval during the telephone communications session; and
  in response to detecting the termination of the alerting interval, terminating the transmission of the at least one control protocol message to in-path equipment associated with the telephone communications session, the termination of the transmission of the at least one control protocol message enabling reactivation of audio signal processing.

15. The method of claim 14 wherein terminating the transmission of the at least one control protocol message to in-path equipment associated with the telephone communications session comprises at least one of:
  terminating the transmission of at least one tandem free operation (TFO) message to in-path equipment associated with the telephone session; and
  terminating the transmission of at least one transcoder free operation (TrFO) message to in-path equipment associated with the telephone session.

16. The method of claim 1 wherein the alerting interval occurs on the first calling device, the detected noisy telephone communications session based on an environment of the first calling device.

17. The method of claim 1 further comprising boosting the ringback signal in response to detection of noise from a caller background and boosting to compensate for an inability of a caller to hear the ringback.

18. A non-transitory computer readable medium encoded with executable instructions including:
  instructions operable on a processor to detect initiation of an alerting interval that occurs during the telephone communications session, the alerting interval providing a ringback signal to a first calling device while the telephone communications session attempts to engage a user of a second calling device in the telephone communications session;
  in response to detecting the event associated with an alerting interval, instructions operable on a processor to modify state associated with audio processing applied to the telephone communications session, the audio processing adjusting an audio characteristic of audio transmitted during the telephone communications session;
  wherein the instructions operable on a processor to detect initiation of an alerting interval that occurs during the telephone communications session comprises:
    instructions operable on a processor to detect activation of the alerting interval during the telephone communications session; and
  wherein the instructions operable on a processor to modify state associated with audio processing applied to the telephone communications session comprises:

in response to detecting activation of the alerting interval, instructions operable on a processor to adjust the audio processing applied to the telephone communications session during the alerting interval by boosting the ringback signal received by the caller during the alerting interval in response to detecting a noisy telephone communications session.

19. The computer readable medium of claim 18 wherein the instructions operable on a processor to adjust the audio processing applied to the telephone communications session comprises at least one of:

instructions operable on a processor to deactivate noise reduction processing applied to the ringback signal during the alerting interval; and instructions operable on a processor to deactivate echo cancellation processing applied to the ringback signal during the alerting interval.

20. A computerized device comprising:

a memory;

a processor;

a communications interface;

an interconnection mechanism coupling the memory, the processor and the communications interface; and wherein the memory is encoded with a ringback manager application that when executed on the processor provides a ringback manager process that implements ringback enhancement processing on the computerized device such that:

the ringback manager process detects initiation of an alerting interval that occurs during the telephone communications session, the alerting interval providing a ringback signal to a first calling device while the telephone communications session attempts to engage a user of a second calling device in the telephone communications session;

in response to detecting the event associated with an alerting interval, the ringback manager process modifies state associated with audio processing applied to the telephone communications session, the audio processing adjusting an audio characteristic of audio transmitted during the telephone communications session by boosting the ringback signal received by the caller during the alerting interval in response to detecting a noisy telephone communications session.

21. The computerized device of claim 20 wherein the ringback manager process modifies state associated with audio processing applied to the telephone communications session comprises:

the ringback manager process transmits at least one control protocol message to in-path equipment associated with the telephone communications session to adjust audio processing applied to the ringback signal by the in-path equipment to the telephone communications session during the alerting interval.

\* \* \* \* \*